(12) United States Patent
Schilit et al.

(10) Patent No.: US 6,279,014 B1
(45) Date of Patent: Aug. 21, 2001

(54) METHOD AND SYSTEM FOR ORGANIZING DOCUMENTS BASED UPON ANNOTATIONS IN CONTEXT

(75) Inventors: William Noah Schilit; Morgan N. Price; Gene Golovchinsky, all of Palo Alto; Lynn D. Wilcox, Portola Valley, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/929,427

(22) Filed: Sep. 15, 1997

(51) Int. Cl.⁷ ........................................................ G06F 17/30
(52) U.S. Cl. ................................................................ 707/512
(58) Field of Search ........................... 707/512, 513, 707/514, 515, 516, 517, 518, 519, 520, 541; 395/800, 801, 802, 141, 142, 143

(56) References Cited

U.S. PATENT DOCUMENTS

| | | |
|---|---|---|
| 5,063,600 | 11/1991 | Norwood . |
| 5,204,947 * | 4/1993 | Bernstein et al. .................... 707/501 |
| 5,517,578 * | 5/1996 | Atlman et al. ....................... 707/526 |
| 5,561,446 | 10/1996 | Montlick . |
| 5,590,257 | 12/1996 | Forcier . |
| 5,592,608 * | 1/1997 | Weber et al. ......................... 345/358 |
| 5,822,539 * | 10/1998 | Van Hoff ............................. 709/236 |
| 5,831,615 * | 10/1998 | Drews et al. ........................ 345/344 |
| 5,832,744 * | 10/1998 | Lopresti et al. ......................... 707/2 |
| 5,913,221 * | 6/1999 | Kano et al. .......................... 707/530 |

FOREIGN PATENT DOCUMENTS 0 791 883 A2    8/1997   (EP) .

OTHER PUBLICATIONS

L. Wilcox et al., "Dynomite: A Dynamically Organized Ink and Audio Notebook", *Chi 97*, pp 186–193, (1997).
"Marquee: A Tool for Real–Time Video Logging", K. Webber et al., *Proceedings of CHI '94*, Apr. 1994, pp. 58–64.
"Dynomite: A Dynamically Organized Ink and Audio Notebook", L. Wilcox et al., *In CHI '97 Conference Proceedings*, ACM Press, 1997, p. 186–193.
"Classroom 2000: Enhancing Classroom Interaction and Review", G. Abowd et al., *In proceedings of CSCW '96*, Mar. 1996.
"As We May Think", V. Bush, *Atlantic Monthly*, Jul. 1945, pp. 101–108.
"The Point of the Pen", *Laptop Technologies*, Robert M. Carr, Feb., 1991, pp. 211–220.
"Shared Web Annotations as a Platform for Third–Party Value–Added Information Providers: Architecture, Protocols, and Usage Examples", *Technical Report CSDTR/DLTR*, Martin Roscheisen, et al., Jul. 1997, pp. 1–34.

* cited by examiner

*Primary Examiner*—Joseph H. Feild
*Assistant Examiner*—Robert D Bourque
(74) *Attorney, Agent, or Firm*—Oliff & Berridge, PLC

(57) ABSTRACT

A document organizing system extracts annotations made to a document along with the context surrounding each annotation and organizes the annotations based upon the annotation attributes and/or context. The annotations are created by grouping marks based upon their proximity in time and space. The document is segmented to determine a minimum context associated with each annotation. A list of the annotations sorted by the attributes are then displayed to the user. The context provided by the invention for each annotation allows the user to fully understand the annotation.

34 Claims, 6 Drawing Sheets

MONEY 281 transacted with a much smaller quantity of money; the same pieces, by a more rapid circulation, serving as the instrument of many more purchases of the one kind than of the other.

Paper money may be so regulated, as either to confine itself very much to the circulation between the different dealers, or to extend itself likewise to a great part of that between the dealers and the consumers. Where no bank notes are circulated under ten pounds value, as in London, paper money confines itself very much to the circulation between the dealers. When a ten pound bank note comes into the hands of a consumer, he is generally obliged to change it at the first shop where he has occasion to purchase five shillings worth of goods; so that it often returns into the hands of a dealer, before the consumer has spent the fortieth part of the money. Where bank notes are issued for so small sums as twenty shillings, as in Scotland, paper money extends itself to a considerable part of the circulation between dealers and consumers. Before the act of parliament, which put a stop to the circulation of ten and five shilling notes, it filled a still greater part of that circulation. In the currencies of North America, paper was commonly issued for so small a sum as a shilling, and filled almost the whole of that circulation. In some paper currencies of Yorkshire, it was issued even for so small a sum as a sixpence.

Where the issuing of bank notes for such very small sums is allowed and commonly practised, many mean people are both enabled and encouraged to become bankers. A person whose promissory note for five pounds, or even for twenty shillings, would be rejected by every body, will get it to be received without scruple when it is issued for so small a sum as a sixpence. But the frequent bankruptcies to which such beggarly bankers must be liable, may occasion a very considerable inconveniency, and sometimes even a very great calamity, to many poor people who had received their notes in payment.

It were better, perhaps, that no bank notes were issued in any part of the kindom for a smaller sum than five pounds. Paper money would then, probably, confine itself, in every part of the kindom, to the circulation between the different dealers, as much as it does at present in London, where no

FIG.3 tween the dealers and the consumers. Where no bank notes
are circulated under ten pounds value, as in London, paper  ⎯33
money confines itself very much to the circulation between shillings worth of goods; so that it often returns into the
hands of a dealer, before the consumer has spent the forti-
eth part of the money. Where bank notes are issued for so ⎯35
small sums as twenty shillings, as in Scotland, paper money

⎯37 notes, it filled a still greater part of that circulation. In the
currencies of North America, paper was commonly issued for
so small a sum as a shilling, and filled almost the whole of

36 was issued even for so small a sum as a sixpence.
   Where the issuing of bank notes for such very small sums
is allowed and commonly practised, many mean people are
both enabled and encouraged to become bankers. A person

38 as a sixpence. But the frequent bankruptcies to which such
beggarly bankers must be liable, may occasion a very con-
siderable inconveniency, and sometimes even a very great
calamity, to many poor people who had received their notes

FIG.4

MONEY transacted with a much smaller quantity of money; the same pieces, by a more rapid circulation, serving as the instrument of many more purchases of the one kind than of the other.

Paper money may be so regulated, as either to confine itself very much to the circulation between the different dealers, or to extend itself likewise to a great part of that between the dealers and the consumers. Where no bank notes are circulated under ten pounds value, as in London, paper money confines itself very much to the circulation between the dealers. When a ten pound bank note comes into the hands of a consumer, he is generally obliged to change it at the first shop where he has occasion to purchase five shillings worth of goods; so that it often returns into the hands of a dealer, before the consumer has spent the fortieth part of the money. Where bank notes are issued for so small sums as twenty shillings, as in Scotland, paper money extends itself to a considerable part of the circulation between dealers and consumers. Before the act of parliament, which put a stop to the circulation of ten and five shilling notes, it filled a still greater part of that circulation. In the currencies of North America, paper was commonly issued for so small a sum as a shilling, and filled almost the whole of that circulation. In some paper currencies of Yorkshire, it was issued even for so small a sum as a sixpence.

Where the issuing of bank notes for such very small sums is allowed and commonly practised, many mean people are both enabled and encouraged to become bankers. A person whose promissory note for five pounds, or even for twenty shillings, would be rejected by every body, will get it to be received without scruple when it is issued for so small a sum as a sixpence. But the frequent bankruptcies to which such beggarly bankers must be liable, may occasion a very considerable inconveniency, and sometimes even a very great calamity, to many poor people who had received their notes in payment.

It were better, perhaps, that no bank notes were issued in any part of the kindom for a smaller sum than five pounds. Paper money would then, probably, confine itself, in every part of the kindom, to the circulation between the different dealers, as much as it does at present in London, where no

FIG.5

METHOD AND SYSTEM FOR ORGANIZING DOCUMENTS BASED UPON ANNOTATIONS IN CONTEXT

BACKGROUND OF THE INVENTION

1. Field of Invention

This invention is directed to a document organizing system. In particular, this invention is directed to a method and a system for organizing documents based upon the context of annotations made to those documents.

2. Description of Related Art

When people read paper documents, they often make annotations to highlight interesting or controversial passages and to record their reactions. Common annotations include margin notes, vertical bars, stars, circles, underlines, highlights, etc. Two advantages of annotating directly on the page are its low overhead and convenience. One disadvantage is that the recorded information is hidden and inaccessible until the reader returns to the specific page in the specific document.

To avoid this problem, some readers use a separate reading notebook to record their annotations. A reading notebook is useful because it provides a separate summary of what the user has read along with any commentary. The advantage of a reading notebook is that it permits a quick review of the material because it generally has less information to browse and search than the original document. One disadvantage of a reading notebook, however, is that the reader must recreate the context for each note to fully understand the meaning of each note.

Readers also use note cards to organize notes. The advantage of a note card system is that the cards can be easily reorganized. However, as with a reading notebook, unless the reader recreates it, there is no context available to permit the user to fully understand the notes. Additionally, each note must be categorized onto the correct card before it can be recorded.

Handwritten notes and keywords are used in a system known as "Marquee" to index video. This system is described in "Marquee: A Tool for Real-Time Video Logging", K. Webber et al., *Proceedings of CHI '94*, April 1994, pp. 58–64, incorporated herein by reference in its entirety. In "Marquee", notes are synchronized to a video string with time zones that are created with horizontal line gestures. Keywords are identified by the user by circling the words and notes that the user has selected as keywords. The keywords are assigned to the time zone in which the keyword is created. Keywords also may be assigned directly by the user by typing the keyword in manually. Because the keywords are associated with time the user can view an index of time zones and go directly to the video by selecting a time zone using an index of the previously identified keyword or annotations. Although "Marquee" uses annotations to index a video document, it does not combine the annotations with the document in a visual way. "Marquee" is thus analogous to notetaking in a separate notebook rather than on the document itself.

"Dynomite" is a free-form digital "ink" notebook. The digital ink notebook is a pen-based computer that the user controls by writing with a pen directly on the screen of the computer. The computer senses the location and the positions traversed as the pen moves across the display and assigns ink marks that correspond with the positions of the pen. These ink marks are called digital ink because the ink is described by the computer digitally. Dynomite extracts the ink, assigns properties to each ink mark and can present a list of the ink marks sorted by the assigned properties. This list is known as an ink index. This system is described in co-assigned and co-pending U.S. patent application, Ser. No. 08/821,311, filed on Mar. 20, 1997, entitled "System for Capturing and Retrieving Audio Data and Corresponding Handwritten Notes", and "Dynomite: A Dynamically Organized Ink and Audio Notebook", by L. Wilcox et al., *In CHI '97 Conference Proceedings*, ACM Press, 1997, pp. 186–193, incorporated herein by reference in their entireties. This ink index shows a "type" of the "ink" along with a time stamp and provides links to the original notebook pages. Dynomite's ink index provides "ink" marks linked to the corresponding full notebook page. However, Dynomite organizes only the ink notes themselves and not the associated information.

"ComMentor" is a platform for shared annotations that attaches text-based comments to locations within web documents. This system is described in "Shared Web Annotations as a Platform for Third-Party Value-Added Information Providers: Architecture, Protocols, and Usage Examples", by M. Roscheisen, et al., Technical Report STAN-CS-TR-97-1582, Stanford Integrated Digital Library Project, Computer Science Department, Stanford University, November 1994, Updated April 1995, incorporated herein by reference in its entirety. Annotations are grouped into sets. A user can filter these sets and tour through documents within a set. A tour window shows a list of annotations, each annotation shown with the document title of the annotated document and a number of annotation attributes. Clicking on the annotation causes the display to jump to the source document at the position of the annotation. ComMentor uses filtered annotations to produce lists of read documents, but does not support paper-like annotations or present lists of annotations in context.

Classroom 2000 is a system for capturing a lecture using recorded audio, prepared visual materials and handwritten notes made on a display overlay of viewgraphs. This system is described in "Classroom 2000: Enhancing Classroom Interaction and Review", by G. Abowd et al., *In Proceedings of CSCW '96*, March 1996, incorporated herein by reference in its entirety. Searching the text in the viewgraphs retrieves the viewgraphs along with the overlaid notes.

The Freestyle system, which was developed at Wang Laboratories, is a mechanism for sketching and writing on screen snapshots or on sheets of electronic paper. Freestyle records cursor movement and audio as well as the handwriting. This system is described in "Rapid Integrated Design of a Multimedia Communication System, and Human-Computer Interface Design", E. Francik, Marianne Rudisill et al. (editor), Morgan Kaufman Publishers, Inc., 1996, incorporated herein by reference in its entirety. The result is a dynamic multimedia message that can be mailed to others. Freestyle does not provide the ability to organize the handwritten annotations.

The PENPOINT operating system for pen-based computers, recognizes pen gestures for editing and allows arbitrary "ink" marks to be placed on top of any document using an "acetate layer". This system is described in "The Power of PENPOINT", by R. Carr et al., Addison-Wesley, Inc., 1991, incorporated herein by reference in its entirety. Although both Freestyle and PENPOINT support free-form document annotation, neither provides any way to retrieve documents based upon those annotations.

In 1945 Vannevar Bush described a vision of a mesh of trails running through a mechanized private file and library or memex in "As We May Think", in *Atlantic Monthly*, July 1945, pp. 101–108, incorporated herein by reference in its entirety. These trails were produced as part of the reading activity, and provided a way to create and share personal organizations of information. Bush's visions were seminal in the development of hypermedia systems such as Engelbart's NLS and the World Wide Web. However, hypermedia systems have focused on sharing, browsing and more explicit authoring of links, not on personal organization and annotation.

Thus, an annotation system for electronic documents is needed that combines the advantages of marking directly on a document with quick accessibility and the flexible organization of marking on note cards or in a notebook.

SUMMARY OF THE INVENTION

This invention provides a system and method for using digital "ink" for annotations in context to organize a reader's activities. The system and method of this invention extracts the contents surrounding and underlying a reader's annotations and presents this information to the reader with links to the full context. The annotations in context provided by the system and method of this invention permits flexible low-overhead organization of material without adding to the effort of reading and notetaking.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIG. 3 shows a document annotated according to this invention;

FIG. 4 shows the annotated portions of the document of FIG. 3

FIG. 5 shows another view of the annotated document of FIG. 3; and

DETAILED DESCRIPTION OF PREFERRED EMBODIMENTS

Figure 1:
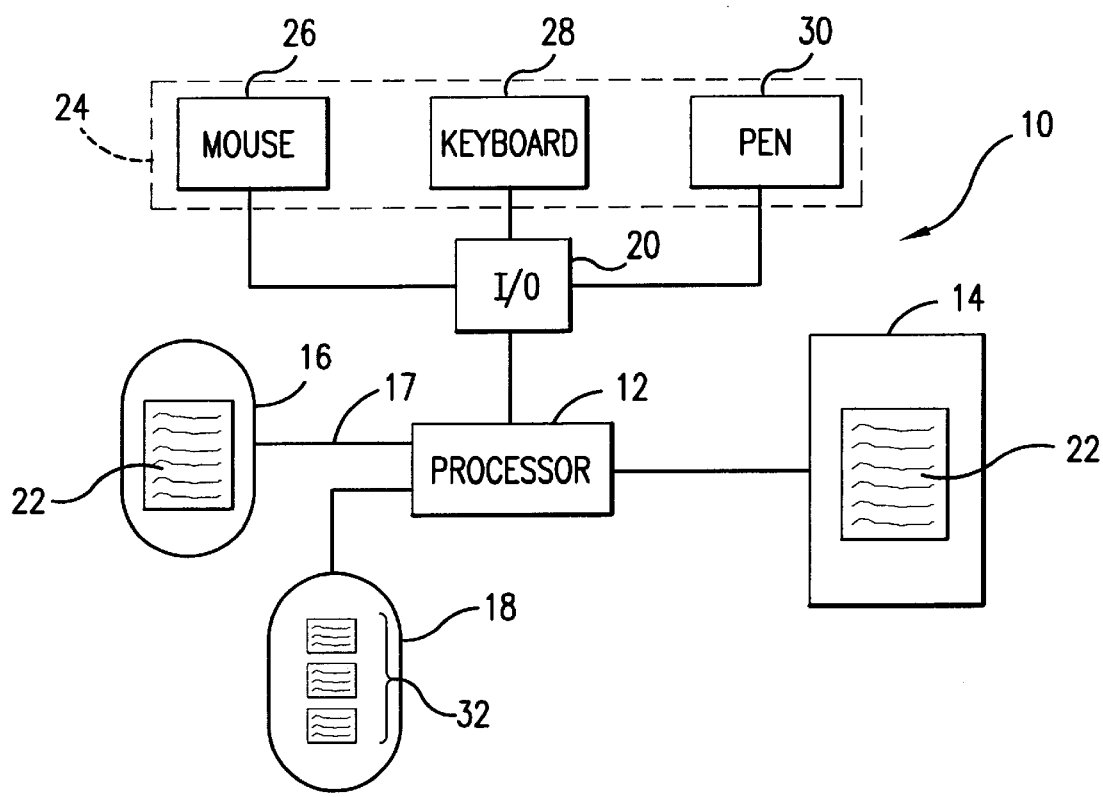
FIG. 1 is a block diagram of the document organizing system of this invention.

FIG. 1 is a block diagram of one embodiment of the electronic document organizing system 10 of this invention. The system 10 has a processor 12 communicating with a display 14, a first storage device 16, a second storage device 18 and an input/output interface 20. The first storage device 16 stores a document 22 displayable on the display 14. The input/output interface 20 communicates with any number of conventional input/output devices 24 such as a mouse 26, a keyboard 28 and/or a pen-based device 30. A user manipulates the input/output devices 24 to annotate the document 22 when displayed on the display 14. The system 10 then stores these annotations 32 in the second storage device 18.

As shown in FIG. 1, the system 10 is preferably implemented using a programmed general purpose computer. However, the system 10 can also be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flowchart shown in FIG. 2 can be used to implement the system 10.

Additionally, as shown in FIG. 1, the memories 16 and 18 are preferably implemented using static or dynamic RAM. However, the memories 16 and 18 can also be implemented using a floppy disk and disk drive, a writable optical disk and disk drive, a hard drive, flash memory or the like. Additionally, it should be appreciated that the memories 16 and 18 can be either distinct portions of a single memory or physically distinct memories.

Furthermore, it should be appreciated that the link 17 connecting the memory 16 and the processor 10 can be a wired or wireless link to a network (not shown). The network can be a local area network, a wide area network, an intranet, the internet or any other distributed processing and storage network. In this case, the electronic document 22 is pulled from a physically remote memory 16 through the link 17 for processing in the processor 10 according to the method outlined below. In this case, the electronic document 22 can be stored locally in a portion of the memory 18 or some other memory (not shown) of the system 10.

The method of this invention includes three distinct processes. First, the reader makes annotations on a displayed document, and the annotations are extracted along with their context. Second, the system associates a number of attributes with the annotations in order to facilitate retrieval of the annotations and/or the underlying annotated documents. Third, the reader views collections of the annotations in context, where the collections are organized by those attributes.

The system 10 records annotations on electronic documents. A preferred interface for entering the annotations is a pen-based computer, where the reader "writes" directly on the electronic document. On a desktop computer without a pen, clicking a mouse in a margin might create a text overlay box to create the annotation. The system 10 may also support a number of different styles of marking. For example, these styles can include swiping with a highlighter pen, underlining text, vertical bars in the margin, circled regions, and margin notes.

Figure 2:
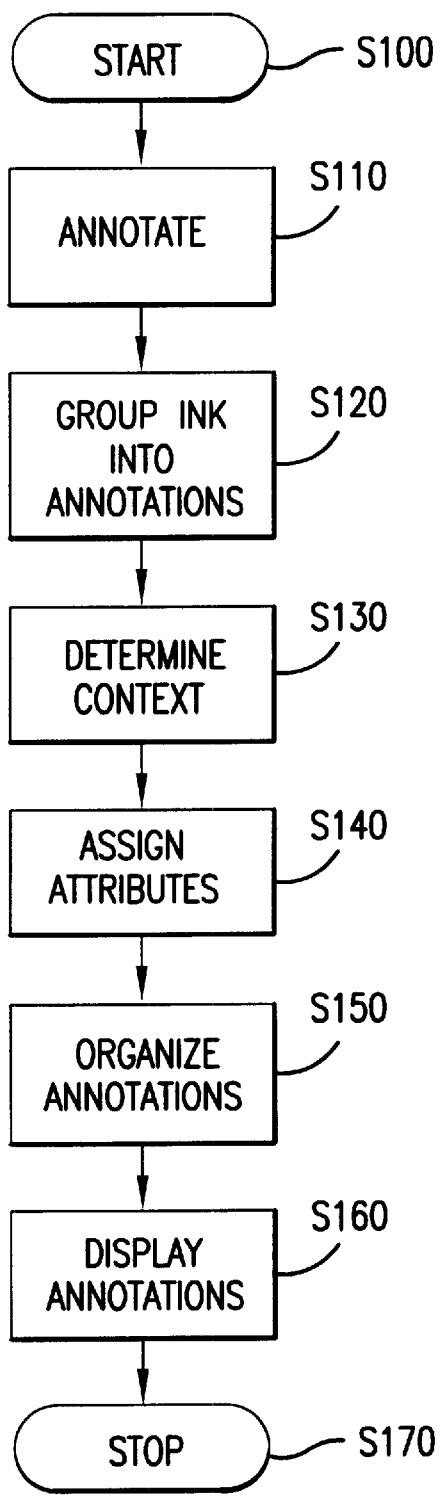
FIG. 2 is a flow chart outlining the control routine of one embodiment of this invention.

FIG. 2 is a flow chart outlining a control routine of one embodiment of the invention. The control routine starts at step S100 and proceeds to step S110, where the user marks on the display of the document with digital ink to annotate it. The control routine then proceeds to step S120, where the system groups the marks of the digital ink by time and/or space into collections of marks, treated as a single annotation as will be described in more detail below. Next, the control routine proceeds to step S130, where the system determines the minimum context for each annotation. The system has a minimum context that determines how much of the document that surrounds the annotation is to be associated with the annotation. The minimum context may be predetermined as a user preference to be a few words, a sentence, a paragraph or any other amount in accordance with the user's preferences. The minimum context can be displayed to the user as a bounding box around the minimum context. The bounding box encloses the bounding region and the minimum context is defined as the content enclosed within the bounding region of the corresponding annotation. Segmentation procedures are applied to the document to divide it into graphical components, e.g., lines of text, sentences, paragraphs and figures. Given the minimum context, the control routine expands the context to include all of the nearby segments. With this procedure, the context may include a couple of lines, the surrounding sentence, or the entire surrounding paragraph. FIG. 5 shows a bounding box 34 with the context around a circle annotation 33.

Figure 6:
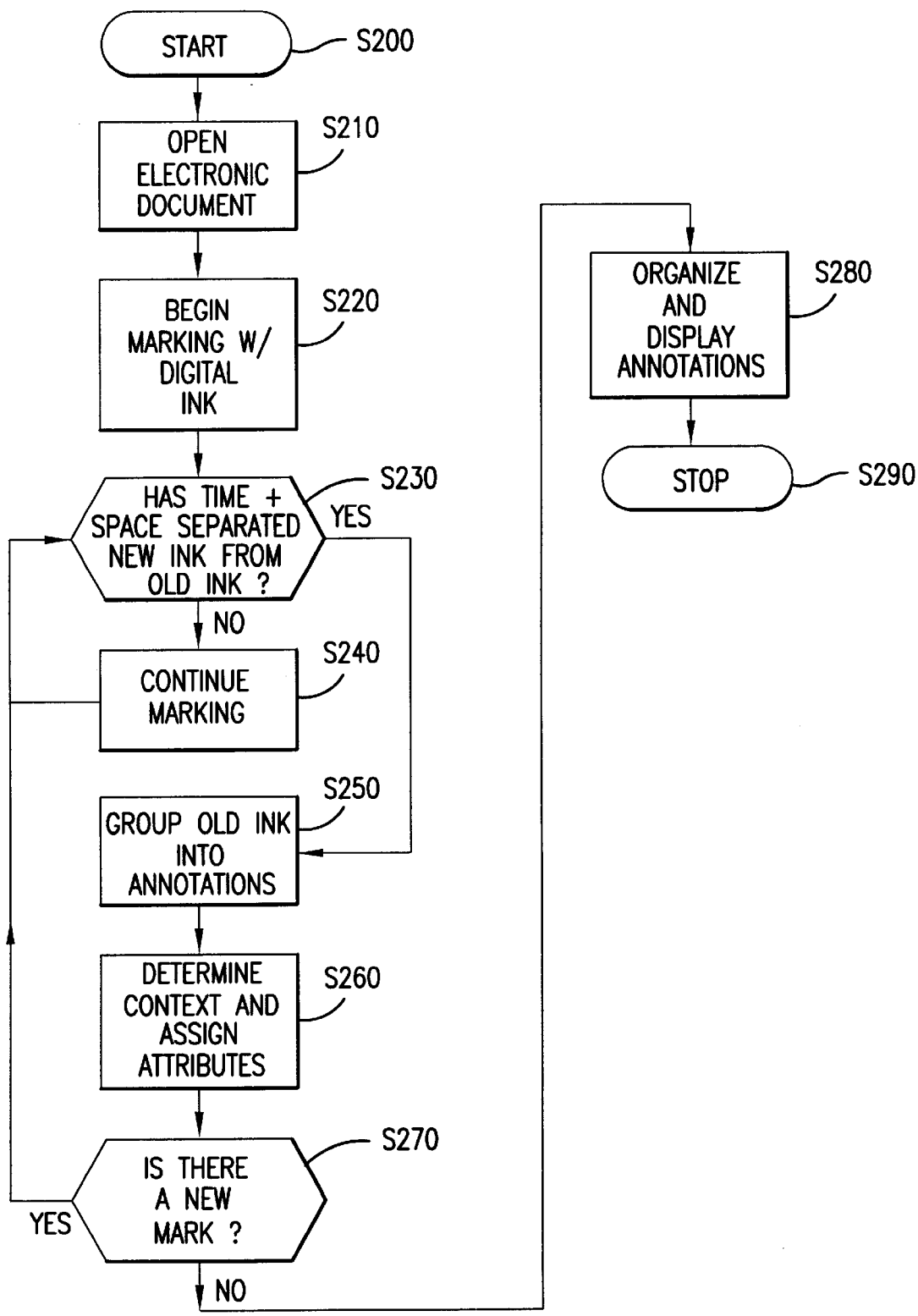
FIG. 6 is a flow chart outlining the annotation control routine of one embodiment of this invention.

The annotation control routine is shown in FIG. 6. The control routine starts at step S200 and proceeds to step S210 where the user selects and opens an electronic document. The user then starts marking on the document at step S220 and creates digital ink. The system then determines at step S230 if the new ink is close enough in time and space to be associated with previous ink marks. The system has time and space thresholds that may be predetermined or adjusted in accordance with a user's preferences. If the system determines at step S230 that the ink marks are not separate the system proceeds to step S240 where the user continues to mark. As each mark is entered by the user steps S230 and S240 are repeated until the system determines that the new ink is separated enough by time and space to proceed to step S250. At step S250 the ink marks are grouped together as a single annotation and at step S260 the context for the annotation is determined and the attributes are assigned to the annotation. The control routine then proceeds to step S270 where the system determines if a new mark has been input. If a new mark has been input the control routine returns to step S230. If no new mark is entered then at step S280 then the annotations are organized and displayed. The control routine then stops at step S290.

For some special annotation formats such as those shown in FIG. 5, the control routine determines the context slightly differently. For margin bars 36 and other notes in the margin 38, the system ignores the horizontal distance when finding nearby segments. Thus, all vertically adjacent material is included in the contexts 40 and 42, respectively. For the line callouts and circle callouts, the control routine determines the minimum contexts and from the underlined or circled text, etc., ignoring the ink in the callout gesture.

After the context of each annotation has been determined, the control routine proceeds to step S140, where the control routine assigns attributes to the annotations in at least one of three ways: 1) attributes entered by the user; 2) attributes inherited from the document's attributes; and 3) implicit or explicit attributes derived from the annotations themselves.

The user may enter attributes by interacting with a dialog box or by selecting from a marking menu, or by selecting a special pen. Example, attributes derived from the annotations themselves include "agree", "disagree", "good idea", and "follow-up". In addition, annotation gestures such as "exclamation point" and "question mark" may be interpreted to mean "good idea" and "questionable" by the system as they are entered on the page. Attributes may also be entered implicitly, the most important of which is the date and time that the annotation was made and the page number at the annotation. Another implicit attribute is the form of the annotation, e.g., highlight, circle, marginal note, etc.

Attributes may also be inferred from documents. In the system 10, the electronic documents are already associated with a variety of attributes, such as creation date, author, provenence and title.

After the attributes are assigned to each annotation at step S140, the control routine proceeds to step S150, where the annotations are organized, ordered or ranked by the assigned attributes. Subsequently, the control routine proceeds to step S160, where the annotations are displayed for the user. The control routine then proceeds to step S170, where the control routine stops.

The system 10 visually presents the annotations in context using different list views. Lists are ordered or filtered by the attributes described above. The system 10 allows the reader to navigate between these views and the underlying electronic documents. Examples of ordered lists include:

1) Ordered by time. This view is analogous to a reader's notebook, but also automatically includes the context of each annotation, as shown in FIG. 4, without further effort by the user.

2) Filtered by attributes. Passages across a number of documents are listed in one view;

3) Filtered by the type of adjacent material. For example, annotations of pictures along with the pictures themselves; and 4) Filtered by the content of adjacent material. For example, annotated passages mentioning patent leather shoes are ranked in relatedness using known information retrieval techniques.

It is to be understood that the term annotation as used herein is intended to include text, digital ink, audio, video or any other input associated with a document. It is also to be understood that the term document is intended to include text, video, audio and any other media and any combination of media. Further, it is to be understood that the term text is intended to include text, digital ink, audio, video or any other content of a document to include the document's structure.

While this invention has been described with the specific embodiments outlined above, many alternatives, modifications and variations are apparent to those skilled in the art. Accordingly, the preferred embodiments described above are illustrative and not limiting. Various changes may be made without departing from the spirit and scope of the invention as defined in the following claims.

What is claimed is:

1. A method for determining the context of annotations from at least one document containing the annotations, comprising:

identifying at least one annotation from the at least one document; and determining, based on the at least one annotation, a context portion for each at least one annotation from a corresponding one of the at least one document.

2. The method of claim 1, further comprising ordering the at least one annotation based on the at least one attribute; and displaying an ordered list of the at least one annotation along with the corresponding context.

3. The method of claim 1, wherein the step of extracting at least one annotation comprises:

grouping marks by time and space into at least one collection, wherein each collection forms an annotation;

segmenting the at least one document into a plurality of segments based on the at least one annotation;

determining a minimum context portion for each annotation, from the segments; and determining the context portion based on the segments surrounding the minimum context.

4. The method of claim 3, wherein, when one of the at least one annotation is a margin note, the step of extracting the at least one annotation comprises determining the context portion by including all segments vertically adjacent to the margin note.

5. The method of claim 3, wherein, when one of the at least one annotation is an underline callout, the step of extracting the at least one annotation comprises determining the minimum context portion based on an underlined portion of the corresponding document.

6. The method of claim 3, wherein, when the at least one annotation is a circle callout, the step of extracting the at least one annotation comprises determining the minimum context from a circled portion of the corresponding document.

7. The method of claim 2, wherein the step of assigning at least one attribute comprises assigning at least one user-defined attribute to each at least one annotation.

8. The method of claim 2, wherein the step of assigning at least one attribute comprises assigning at least one document-based attribute to each at least one annotation.

9. The method of claim 2, wherein the step of assigning at least one attribute comprises deriving at least one attribute for each at least one annotation from the context portion for that annotation.

10. The method of claim 9, wherein the step of deriving the at least one attribute comprises identifying a type of the context portion for that annotation and assigning at least one attribute based on the identified type.

11. The method of claim 9, wherein the step of deriving the at least one an attribute comprises identifying a content of the context portion for that annotation and assigning at least one attribute based on the identified content.

12. The method of claim 1, wherein the step of assigning at least one attribute comprises identifying a mark on the document by the user and assigning at least one attribute corresponding to the identified mark.

13. The method of claim 1, wherein the step of assigning at least one attribute comprises determining a date and/or a time of each of at least one annotation and assigning the corresponding creation date and/or time as an attribute of the annotation.

14. The method of claim 1, wherein the step of assigning at least one attribute comprises determining a page number of each at least one annotation and assigning the corresponding page number as an attribute of the annotation.

15. The method of claim 1, wherein the step of assigning at least one attribute comprises:
  identifying for an annotation, a user-generated mark on the document associated with that annotation; and
  assigning at least one attribute to that annotation based on the identified mark.

16. The method of claim 1, further comprising filtering the annotations based on the assigned attribute.

17. An apparatus for determining the context of annotations from at least one document containing the annotations, the apparatus comprising:
  a memory that stores the at least one document;
  a processor that identifies at least one annotation and a context portion based on the at least one annotation of the at least one document corresponding to each annotation; and
  a display that displays the at least one annotation and the at least one corresponding context portion.

18. The apparatus of claim 17, wherein:
  the processor extracts the at least one annotation grouping at least one user generated mark on the at least one document based on time of at least one mark and a location within the document of the at least one mark into at least one collection, wherein each collection forms a single annotation, the processor determines a minimum context portion of the corresponding document for each annotation; and
  determines the context for each annotation based on the annotation and the minimum context.

19. The apparatus of claim 18, wherein when one of the at least one annotation comprises a margin note, the processor extracts that annotation by including all segments vertically adjacent to the margin note in the corresponding document.

20. The apparatus of claim 18, wherein, when one of the at least one annotation comprises an underline callout, the processor extracts that annotation by determining the minimum context from an underlined portion of the corresponding document.

21. The apparatus of claim 18, wherein, when one of the at least one annotation comprises a circle callout, the processor extracts that annotation determines the context portion based on a circled portion of the corresponding document.

22. The apparatus of claim 17, wherein, for each at least one annotation, the processor assigns the at least one attribute to that annotation based on at least one document-based attribute.

23. The apparatus of claim 17, wherein, for each at least one annotation, the processor assigns the at least one attribute to that annotation based on at least one attribute derived from the context portion corresponding to that annotation.

24. The apparatus of claim 23, wherein, for each at least one annotation, the processor derives the at least one attribute from the context portion based on a type of the context portion corresponding to that annotation.

25. The apparatus of claim 23, wherein, for each at least one annotation, the processor derives the at least one attribute from the context portion based on the content of the context portion corresponding to that annotation.

26. The apparatus of claim 17, wherein when one of the at least one annotation is a mark annotation the processor assigns the at least one attribute based upon that mark annotation.

27. The apparatus of claim 17, wherein, for each at least one annotation, the at least one attribute is at least one of a creation date and a creation time of that annotation.

28. The apparatus of claim 17, wherein, for each at least one annotation, the at least one attribute is the page number of that annotation.

29. The apparatus of claim 17, wherein, for each at least one annotation, the processor assigns the at least one attribute to that annotation based on a user-generated mark on the corresponding document associated with that annotation.

30. The apparatus of claim 17, wherein the processor filters the annotations using the at least one assigned attribute.

31. The method of claim 1, further comprising assigning at least one attribute to each at least one annotation.

32. The apparatus of claim 17, wherein:
  the processor assigns at least one attribute to each extracted annotation and orders the at least one annotation based on the at least one assigned attribute; and
  the display displays the at least one annotation in a list ordered in accordance with the attributes.

33. A method of accepting annotations to at least one document and determining the context of the annotations, comprising:

accepting at least one annotation to the document from a user interface;

storing the at least one annotation;

determining a context based on the at least one annotation for each annotation from a corresponding one of the at least one document;

storing the context for each annotation;

retrieving the at least one annotation and corresponding context; and displaying the retrieved at least one annotation and its corresponding context.

34. An apparatus for accepting annotations to at least one document and for determining the context of the annotations, comprising:

a user interface that accepts annotations to at least one document;

a context identifier responsive to the annotations to identify the contexts of the annotations in the corresponding at least one document;

a storage device that stores the annotations and the corresponding identified contexts;

a processor that retrieves at least one of the stored annotations along with the corresponding context for each retrieved annotation; and a display that displays each retrieved annotation and its context.

* * * * *